(12) United States Patent
Sharma et al.

(10) Patent No.: US 12,262,402 B2
(45) Date of Patent: Mar. 25, 2025

(54) COMMUNICATION SYSTEM

(71) Applicant: NEC Corporation, Tokyo (JP)

(72) Inventors: Vivek Sharma, Sutton (GB); Yuhua Chen, London (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/543,294

(22) PCT Filed: Jan. 13, 2016

(86) PCT No.: PCT/JP2016/000139
§ 371 (c)(1),
(2) Date: Jul. 13, 2017

(87) PCT Pub. No.: WO2016/121307
PCT Pub. Date: Aug. 4, 2016

(65) Prior Publication Data
US 2018/0035436 A1    Feb. 1, 2018

(30) Foreign Application Priority Data
Jan. 30, 2015   (GB) ..................... 1501617

(51) Int. Cl.
*H04W 72/542*   (2023.01)
*H04W 16/14*    (2009.01)
(Continued)

(52) U.S. Cl.
CPC ......... *H04W 72/542* (2023.01); *H04W 16/14* (2013.01); *H04W 76/15* (2018.02);
(Continued)

(58) Field of Classification Search
CPC ..... H04W 40/02; H04W 40/12; H04W 40/22; H04W 40/24; H04W 48/00; H04W 48/08;
(Continued)

(56) References Cited

U.S. PATENT DOCUMENTS 9,894,550 B2 *   2/2018   Jung ..................... H04W 24/10
9,973,959 B2 *   5/2018   Axmon ................. H04W 72/04
(Continued)

FOREIGN PATENT DOCUMENTS

CN   101447853 A   6/2009
CN   101483487 A   7/2009
(Continued)

OTHER PUBLICATIONS

3GPP TS 36.4de V0.0.1 "E-UTRAN X2 interface user plane protocol" (Aug. 2014) (Year: 2014).*
(Continued)

*Primary Examiner* — Oussama Roudani

(57) ABSTRACT

A communication system is described in which a communication apparatus configured provides a first communication path to a user communication device to using a first radio resource and another communication apparatus provides a second communication path to the user communication device to using a second radio resource, different from the first radio resource. The communication apparatus controls flow of user data via the first and second communication paths based on information which is received from the other communication apparatus and which indicates availability of the second radio resource for transmission of the user data.

4 Claims, 9 Drawing Sheets

(51) Int. Cl.
| | |
|---|---|
| *H04W 76/15* | (2018.01) |
| *H04W 84/04* | (2009.01) |
| *H04W 84/12* | (2009.01) |
| *H04W 88/06* | (2009.01) |

(52) U.S. Cl.
CPC .......... *H04W 84/042* (2013.01); *H04W 84/12* (2013.01); *H04W 88/06* (2013.01)

(58) Field of Classification Search
CPC ... H04W 48/16; H04W 48/01; H04W 72/085; H04W 16/14; H04W 72/1231; H04W 76/15; H04W 84/042; H04W 84/12; H04W 88/06; H04W 28/08; H04W 72/1226; H04W 74/0808; H04W 28/0278; H04W 72/1278; H04W 72/0406; H04W 72/542; H04W 74/02; H04W 72/0453; H04W 72/541; H04W 72/20
See application file for complete search history.

(56) References Cited

U.S. PATENT DOCUMENTS

| | | | | |
|---|---|---|---|---|
| 10,374,757 | B2* | 8/2019 | Koskinen | H04L 1/1864 |
| 2010/0246506 | A1 | 9/2010 | Krishnaswamy | |
| 2010/0285756 | A1* | 11/2010 | Nakazawa | H04W 8/04 455/69 |
| 2011/0255526 | A1 | 10/2011 | Kaneko et al. | |
| 2011/0319129 | A1 | 12/2011 | Bhat et al. | |
| 2013/0083661 | A1* | 4/2013 | Gupta | H04W 28/0247 370/235 |
| 2013/0088897 | A1 | 4/2013 | Adragna | |
| 2013/0210445 | A1 | 8/2013 | Nakamura et al. | |
| 2013/0336156 | A1 | 12/2013 | Wei et al. | |
| 2014/0029531 | A1 | 1/2014 | Chang et al. | |
| 2014/0086211 | A1* | 3/2014 | Liu | H04L 45/38 370/331 |
| 2014/0089471 | A1* | 3/2014 | Pianese | H04L 49/9005 709/219 |
| 2014/0092828 | A1* | 4/2014 | Sirotkin | H04B 17/318 370/329 |
| 2014/0169300 | A1* | 6/2014 | Kim | H04L 5/0057 370/329 |
| 2014/0254471 | A1* | 9/2014 | Fang | H04W 84/047 370/329 |
| 2014/0369201 | A1 | 12/2014 | Gupta et al. | |
| 2015/0049707 | A1* | 2/2015 | Vajapeyam | H04W 24/10 370/329 |
| 2015/0180676 | A1* | 6/2015 | Bao | H04L 12/1886 370/230 |
| 2015/0296084 | A1* | 10/2015 | Alonso | H04M 3/42246 455/417 |
| 2015/0304875 | A1* | 10/2015 | Axmon | H04W 24/10 370/328 |
| 2015/0334724 | A1* | 11/2015 | Faccin | H04W 76/36 370/235 |
| 2015/0350990 | A1* | 12/2015 | Fujishiro | H04W 36/14 370/331 |
| 2016/0219478 | A1* | 7/2016 | Huang-Fu | H04W 28/12 |
| 2016/0219481 | A1* | 7/2016 | Wang | H04W 36/30 |
| 2016/0337958 | A1* | 11/2016 | Fujishiro | H04W 28/0252 |
| 2016/0338132 | A1* | 11/2016 | Uchino | H04L 5/001 |
| 2017/0078905 | A1* | 3/2017 | Kasslin | H04L 43/16 |
| 2017/0156075 | A1* | 6/2017 | Harada | H04W 16/14 |
| 2017/0164419 | A1* | 6/2017 | Kim | H04L 5/00 |
| 2017/0181153 | A1* | 6/2017 | Choi | H04B 7/0417 |
| 2019/0261265 | A1* | 8/2019 | Wakabayashi | H04W 4/70 |
| 2019/0342851 | A1* | 11/2019 | Shan | H04W 12/06 |
| 2022/0279412 | A1* | 9/2022 | Wu | H04W 76/27 |

FOREIGN PATENT DOCUMENTS

| | | |
|---|---|---|
| CN | 101925066 A | 12/2010 |
| CN | 102457361 A | 5/2012 |
| CN | 102801506 A | 11/2012 |
| CN | 103888987 A1 | 6/2014 |
| CN | 104170303 A1 | 11/2014 |
| KR | 20000026091 A | 5/2000 |
| WO | 2012/175360 A1 | 12/2012 |
| WO | 2013/072222 A1 | 5/2013 |
| WO | 2013/167557 A1 | 11/2013 |
| WO | 2013/179095 A1 | 12/2013 |
| WO | 2013185835 A1 | 12/2013 |
| WO | 2014/110397 A1 | 7/2014 |
| WO | 2015/005738 A1 | 1/2015 |
| WO | 2015/008989 A1 | 1/2015 |
| WO | 2015/013193 A1 | 1/2015 |
| WO | 2015/080861 A1 | 6/2015 |

OTHER PUBLICATIONS

Communication dated Feb. 7, 2018 from the Japanese Patent Office in counterpart Japanese application No. 2017-534850.
$3^{rd}$ Generation Partnership Project; Technical Specification Group Radio Access Network; Study on Wireless Local Area Network (WLAN)—3GPP radio interworking (Release 12), 3GPP TR 37.834 V12.0.0 (Dec. 2013), Jan. 7, 2014, pp. 7-16 (17 pages).
3GPP TR 36.842, V12.0.0 (Dec. 2013), Technical Report, $3^{rd}$ Generation Partnership Project; Technical Specification Group Radio Access Network; Study on Small Cell enhancements for E-UTRA and E-UTRAN; Higher layer aspects (Release 12), 71 pages.
3GPP TS 36.300, V12.4.0, (Dec. 2014), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 251 pages.
3GPP TS 36.425, V12.0.0, (Dec. 2014), Technical Specification, $3^{rd}$ Generation Partnership Project; Technical Specification Group Radio Access Network; Evolved Universal Terrestrial Radio Access Network (E-UTRAN); X2 interface user plane protocol (Release 12), 15 pages.
Draft ETSI EN 301 893, V1.7.2, (Jul. 2014), Harmonized European Standard, Broadband Radio Access Networks (BRAN); 5 GHz high performance RLAN; Harmonized EN covering the essential requirements of article 3.2 of the R&TTE Directive, 95 pages.
3GPP TS 36.423, V12.4.2, (Dec. 2014), Technical Specification, $3^{rd}$ Generation Partnership Project; Technical Specification Group Radio Access Network; Evolved Universal Terrestrial Radio Access Network (E-UTRAN); X2 application protocol (X2AP) (Release 12), 204 pages.
Ericsson, "Considerations on power control for Dual Connectivity," 3GPP TSG-RAN #84, Tdoc R2-134234, Nov. 11-13, 2013, 4 pages.
Written Opinion of the International Searching Authority of PCT/JP2016/000139 dated Jun. 16, 2016.
International Search Report of PCT/JP2016/000139 dated Jun. 16, 2016.
Communication dated Dec. 11, 2018, from the Japanese Patent Office in counterpart application No. 2018-037283.
Hisilicon Huawei, "Further analysis on the required functionalities for LAA", 3GPP TSG-RAN WG1 Meeting #79, R1-144590, San Francisco, USA, Nov. 17-24, 2014 (4 pages total).
Huawei, "Data Transmission to Support Dual Connectivity UP 3C", 3GPP TSG-RAN WG3 Meeting #83, R3-140120, Prague, Czech Republic, Feb. 10-14, 2014 (3 pages total).
"Signaling Procedure for Dual Connectivity", MediaTek Inc., 3GPP TSG-RAN2 #85 Meeting, R2-14 0196, Feb. 10-14, 2014, pp. 1-6 ( 6 pages total).
"Regulatory requirements affecting L1 design for LTE LAA", InterDigital Communications, 3GPP TSG-RAN WG1#78bis , R1-144218, Oct. 6-10, 2014, pp. 1-4, (4 pages total).
Communication dated May 7, 2019, from the Japanese Patent Office in counterpart application No. 2018-037283.
Communication dated Jul. 31, 2019, from the European Patent Office in counterpart European Application No. 16702593.1.
Communication dated Jul. 30, 2019, from the Japanese Patent Office in counterpart Application No. 2018-037283.

(56) References Cited

OTHER PUBLICATIONS

NEC, "TP for SeNB on UE-AMBR : UE-Associated Information—36.423: Alt1", 3GPP TSG-RAN WG3#87, R3-150168, Athens, Greece, Feb. 9-13, 2015 (102 pages total).

NEC, "TP for SeNB on UE-AMBR : UE-Associated Information—36.423: Alt1", 3GPP TSG-RAN WG3#86, R3-142810; San Francisco, USA, Nov. 17-21, 2014 (96 pages total).

NEC, "TP for SeNB on UE-AMBR : UE-Associated Information—36.413", 3GPP TSG-RAN WG3#85bis, R3-142348, Shanghai, China, Oct. 6-10, 2014 (15 pages total).

Alcatel-Lucent et al., "Required Functionalities and Design Targets for Licensed-Assisted Access Using LTE", 3GPP TSG RAN WG1 Meeting #78bis, R1-144080, Ljubljana, Slovenia, Oct. 6-10, 2014, 3 pages total.

Communication dated Nov. 29, 2019, from the China National Intellectual Administration in counterpart application No. 201680008152.3.

Decision For Grant of Patent dated Dec. 9, 2019 issued by the Korean Intellectual Property Office in counterpart Application No. 10-2017-7024269.

Chinese Office Communication for CN Application No. 201680008152.3 mailed on Jan. 6, 2022 with English Translation.

3GPP TS 09.02 V6.13.0 (Mar. 2003), Mobile Application Part (MAP) specification (Release 1997), Apr. 7, 2003.

Extended European Search Report for EP Application No. EP22150810.4 dated on Mar. 28, 2022.

NEC: "Transmission of discard indication", 3GPP Draft: R3-142804, USA, Nov. 17, 2014 (Nov. 17, 2014).

Ericsson: "How to set and interpret the "Available buffer size" indication", 3GPP Draft; R3-142449, P. R. China, Sep. 27, 2014 (Sep. 27, 2014).

ZTE: "Correction on 36.425", 3GPP Draft; R3-142255, P. R. China, Oct. 5, 2014 (Oct. 5, 2014).

CN Office Action for Chinese Patent Application No. 202210273010.7, mailed on Apr. 25, 2024 with English Translation.

ZTE, "Correction on 36.425", 3GPP TSG-RAN WG3 #85bis R3-142255, Sep. 26, 2014.

NEC, "Transmission of discard indication", 3GPP TSG-RAN WG3#86 R3-142804, Nov. 8, 2014.

Ericsson, "How to set and interpret the "Available buffer size" indication", 3GPP TSG-RAN WG3 Meeting #85bis R3-142449, Sep. 27, 2014.

Xiao-wen Li et al., "Analysis and Implementation of Handover Process of Dual Connectivity Technology based on Heterogeneous Networks", Study on Optical Communications 2, Apr. 2017, pp. 68-70.

\* cited by examiner

COMMUNICATION SYSTEM

CROSS REFERENCE TO RELATED APPLICATIONS

This application is a National Stage of International Application No. PCT/JP2016/000139 filed Jan. 13, 2016, which claims priority from British Patent Application No. 1501617.3 filed Jan. 30, 2015, the disclosures of which are incorporated herein by reference in their entirety.

TECHNICAL FIELD

The present invention relates to a communication system and to components thereof for providing communication services to mobile or fixed communication devices. The invention has particular, but not exclusive, relevance to connectivity via multiple base stations in Long Term Evolution (LTE) Advanced systems as currently defined in associated $3^{rd}$ Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

Recent developments in communication networks have seen increased deployment of so called 'small' cells operated by Low Power Nodes (LPNs), such as pico eNBs, femto eNBs, home eNBs (HeNBs) or the like, which cells have a smaller coverage area than existing macro cells operated by a higher power (regular) macro base station. Networks comprising a number of different cell types, for example a network comprising a macro cell and a femto cell, are referred to as Heterogeneous Networks, or HetNets. In the following description the term base station is used to refer to any such macro base station or LPN.

Conventionally, a mobile telephone is configured to communicate via one base station (using an associated radio link). However, in a study on small cell enhancements for E-UTRA and E-UTRAN (3GPP technical report (TR) no. 36.842, the contents of which are incorporated herein by reference), a so-called 'dual connectivity' functionality was introduced to improve, for example, the coverage of high data rates for user equipment, temporary network deployment, cell edge throughput and/or to increase system throughput. The dual connectivity feature established techniques for compatible mobile telephones (and other user equipment) to communicate with multiple network points, substantially simultaneously. Specifically, this 'dual connectivity' functionality refers to an operation mode where a given mobile telephone (operating in RRC_CONNECTED mode) consumes radio resources provided by at least two different network points (e.g. two or more base stations). Typically, one of the network points involved in the dual connectivity functionality is a macro base station and the other network point (or a plurality of network points) comprises a low power node (or plurality of low power nodes). Thus, dual connectivity is also known as inter-site Carrier Aggregation (CA). Further details of CA can be found in the 3GPP TS 36.300 standard, the contents of which are incorporated herein by reference.

CA allows a number of potential deployment scenarios including, for example, a configuration with a macro base station using a first frequency, F1, to provide macro coverage, and a low power node(s) using a second frequency, F2, to improve throughput at hot spots. Alternatively, two macro base stations can provide CA using F1 and F2 respectively. In this regard, there is interest in making use of unlicensed spectrum for CA. This concept is referred to as LTE-U (LTE for Unlicensed Spectrum) in which a primary carrier, e.g. F1, is in the licensed spectrum and a secondary carrier, e.g. F2, is in the unlicensed spectrum. In addition to carrying the signalling information, the primary carrier can be used to transport the mobile data traffic. Conversely, the secondary carrier in the unlicensed spectrum will be more opportunistic and only used in a way that ensures that it shares the spectrum fairly with other systems using the spectrum. The reliance on the primary carrier in the licensed spectrum has resulted in LTE-U being referred to as LAA (Licensed Assisted Access). Thus, LTE-U/LAA can be thought of as a form of CA with the primary carrier (anchor carrier) using licensed spectrum and the secondary carrier using unlicensed spectrum. In principle, LTE-U could operate in any unlicensed frequencies but the initial industry focus is on the 5 GHz band since there is up to 500 MHz of available spectrum around the world and the spectrum is relatively attractive when it comes to providing capacity, especially since LTE-U will be used primarily, if not entirely, in conjunction with small cells. Wi-Fi, specifically 802.11a, 802.11n and 802.11ac, is most frequently associated with using this spectrum. Since dual connectivity is an evolution of CA, it is expected to be supported by LTE-U.

Each network point (also referred to as 'access point') involved in the provision of dual connectivity for a mobile telephone may assume a different role. One of the network points may be referred to as a master base station (MeNB) and each one of the other network points may be referred to as a secondary base station (SeNB). Typically, the various secondary base stations involved in the provision of dual connectivity are coupled (to the MeNB and hence the core network) via a so-called non-ideal backhaul. Further, in a dual connectivity scenario, one of the base stations (the MeNB) routes control plane signaling to the core network via an associated interface (e.g. the S1 interface), regardless of whether or not the other base station is also connected to the core network for user plane communication (e.g. to a serving gateway).

The MeNB/SeNB roles do not necessarily depend on each base station's capabilities/type (e.g. power class) and may be different for different mobile telephones (even when using the same base stations).

In accordance with the dual connectivity functionality, a mapping between the mobile telephone's radio (communication) bearer(s) and the base stations may be realised as follows:
 a so-called Master Cell Group (MCG) bearer in which a radio bearer is served by the MeNB only (or 'MeNB-specific bearer');
 a so-called Secondary Cell Group (SCG) bearer in which a radio bearer is served by the SeNB only (or 'SeNB-specific bearer'); and
 a split bearer in which a radio bearer is served by the MeNB and the SeNB.

Four alternative architecture and protocol enhancements for the split bearer configuration are described in TR 36.842. In each configuration, the S1-U terminates at the MeNB and the bearer is split in the MeNB. Differences include that independent PDCP entities can be provided in the MeNB and SeNB for split bearers ('Alterative 3A'), master-slave PDCP entities can be provided for split bearers ('Alternative 3B'), independent RLC entities can be provided for split bearers ('Alternative 3C'), or master-slave RLC entities can be provided for split bearers ('Alternative 3D'). Considering Alternative 3C in more detail, all dual connectivity traffic is routed, processed and buffered in the MeNB. In particular, the PDCP entity of the MeNB becomes responsible for routing PDCP PDUs towards the SeNB for transmission and reordering them for reception. This means that the MeNB controls the flow of PDCP PDUs between the MeNB and the SeNB, i.e., the fraction of the user-plane data arriving at the MeNB via S1-U to be forwarded to the SeNB via X2-U. If the transmission buffer in SeNB runs out, the user throughput gains of dual-connectivity are reduced. If too much data is pushed to the SeNB transmission buffer, transmission delay via SeNB is increased, up to the point where packets that are transmitted considerably delayed are missing the reordering window at the UE's PDCP layer and will simply be discarded at reception by the UE. At an extreme, the SeNB may need to discard packets received from MeNB due to buffer overflow. Packet loss for both these reasons causes TCP to slow down even when not otherwise necessary. Therefore, a good flow control mechanism is desirable.

TS 36.425, the contents of which are incorporated herein by reference, defines a Downlink Data Delivery Status procedure that enables the SeNB to provide feedback to the MeNB in order to allow the MeNB to control the downlink user data flow via the SeNB for the respective E-RAB. The feedback is provided in the form of a DL DATA DELIVERY STATUS (PDU Type 1) frame (shown later on in the description) which includes information about a) the highest PDCP PDU sequence number successfully delivered in sequence to the UE among those PDCP PDUs received from the MeNB, b) the desired buffer size in bytes for the concerned E-RAB, c) the minimum buffer size in bytes for the UE, and d) the X2-U packets that were declared as being 'lost' by the SeNB and have not yet been reported to the MeNB within the DL DATA DELIVERY STATUS frame. The MeNB, when receiving the DL DATA DELIVERY STATUS frame, regards the desired buffer size under b) and c) above as the amount of data desired from the SeNB being declared from the PDCP sequence number reported under a) above within the same frame, as well as from the most recently reported PDCP sequence number(s) of all other E-RABs established for the UE; as the momentary desired buffer sizes, independent of buffer sizes indicated in the past. The MeNB also is allowed to remove the buffered PDCP PDUs according to the feedback of successfully delivered PDCP PDUs, and decide upon the actions necessary to take for PDCP PDUs reported other than successfully delivered. After being reported to the MeNB, the SeNB removes the respective PDCP sequence numbers.

For an LAA/Wireless Local Area Network (WLAN) access point (AP), the MeNB is aware that the SeNB is LAA and can try to send packets on a best effort basis, e.g., every 10 msecs, and learn from previous channel allocations.

For LTE-U, it is necessary to take account of co-existence issues and requirements dictated by regulations, such as compliance with so called listen-before-talk (LBT) requirements, in order to provide fair and efficient co-existence while still keeping or even enhancing advantages of LTE system.

As required by LBT rules, the transmission of both traffic data and the common channels of LTE-U needs to be based on the knowledge of channel vacancy by instantaneous channel sensing. As mentioned above, in an integrated LTE framework, unlicensed carriers are operated as secondary carriers associated with a licensed LTE primary carrier through carrier aggregation (CA).

Two types of LBT schemes are defined by regulation: Frame Based Equipment (FBE) and Load Based Equipment (LBE). The differences between FBE and LBE include whether a strict frame structure should be followed, interference avoidance mechanism, and channel occupancy time. For both schemes, some efforts are needed to ensure the consistency between the strict frame structure defined in the existing licensed LTE layer and the opportunistic occupancy of unlicensed band, and at the same time allow for flexible channel sensing and occupancy to offer a potentially good channel contention capability.

For example, in the ETSI EN 301 893 standard document, which applies to 5 GHz high performance wireless access systems (WAS) including Radio LAN (RLAN) equipment which is used in wireless local area networks, for frame based equipment (FBE), before starting transmissions on an operating channel, the equipment performs a clear channel assessment (CCA) check using "energy detect". The equipment must observe the operating channel(s) for a duration of the CCA observation time which shall be not less than 18 µs (according to V1.7.2 of the ETSI EN 301 893 standard). The operating channel is considered occupied if the energy level in the channel exceeds a threshold. If the equipment finds the operating channel to be clear, it may transmit immediately. If the equipment finds an operating channel occupied, it shall not transmit on that channel during the next fixed frame period. The total time during which an item of user equipment has transmissions on a given channel, without re-evaluating the availability of that channel, is defined as the Channel Occupancy Time. The Channel Occupancy Time is in the range 1 ms to 10 ms and the minimum Idle Period is set to at least 5% of the Channel Occupancy Time used by the equipment for the current Fixed Frame Period. Towards the end of the Idle Period, the equipment performs a new CCA as described above. The equipment, upon correct reception of a packet which was intended for this equipment, can skip CCA and immediately (see note) proceed with the transmission of management and control frames (e.g. ACK and Block ACK frames). A consecutive sequence of such transmissions by the equipment, without it performing a new CCA, shall not exceed a Maximum Channel Occupancy Time.

SUMMARY OF INVENTION

Technical Problem

However, channel allocation may be performed far less frequently (e.g. less than every 10 msecs) for LTE-U/ WLAN-AP depending on neighbouring devices using the same frequency/channel. Furthermore, scheduling for this particular UE may take longer than channel allocation for the AP because of the number of UEs being served. This issue is compounded by the fact that whilst the LAA node will be aware of the channel allocation frequency the MeNB will have no such information. Further, the dual connectivity split bearer architecture splits PDCP packets across MeNB and SeNB.

Any packet delay due to channel allocation in LAA/WLAN will result in overall bad user experience associated with delayed delivery of the packets to the upper layer.

In summary then, if the flow of data for a UE over a split bearer in dual connectivity is not suitably controlled between the base stations serving the UE and, in particular, if the channel allocation and/or associated scheduling is delayed as a result of the LBT requirement to establish that a channel is vacant before it can be used and/or other factors, this may result in overall bad user experience.

Solution to Problem

Accordingly, preferred exemplary embodiments of the present invention aim to provide methods and apparatus which overcome or at least partially alleviate at least one of the above issues.

In one aspect, the invention provides a communication apparatus configured to operate as part of a configuration in which communication between a network and a user communication device is split into a first communication path provided via the communication apparatus using a first radio resource and a second communication path provided via another communication apparatus using a second radio resource, different from the first radio resource, the communication apparatus comprising: means for receiving information indicating availability of the second radio resource for transmission of user data via the second communication path; and flow control means for controlling flow of user data via the first and second communication paths based on the received information.

In one aspect, the invention provides secondary communication apparatus configured to operate as part of a configuration in which communication between a network and a user communication device is split into a first communication path provided via a master communication apparatus using a first radio resource and a second communication path provided via the secondary communication apparatus using a second radio resource, different from the first radio resource, the secondary communication apparatus comprising: means for generating information indicating availability of the second radio resource for transmission of user data via the second communication path; and means for transmitting the generated information indicating the availability to the master communication apparatus.

In one aspect, the invention provides a user communication device configured to operate as part of a configuration in which communication between a network and the user communication device is split into a first communication path provided via first communication apparatus using a first radio resource and a second communication path provided via second communication apparatus using a second radio resource, different from the first radio resource, the user communication device comprising: means for receiving user data using over the first communication path; means for receiving user data over the second communication path; means for generating information indicating availability of the second radio resource for reception of user data; and means for transmitting the generated information indicating the availability to one of the first communication apparatus and the second communication apparatus.

In one aspect, the invention provides a system comprising the above described communication apparatus, the above described secondary communication apparatus, and the above described user communication device.

In one aspect, the invention provides a method performed by a communication apparatus configured to operate as part of a configuration in which communication between a network and a user communication device is split into a first communication path provided via the communication apparatus using a first radio resource and a second communication path provided via another communication apparatus using a second radio resource, different from the first radio resource, the method comprising: receiving information indicating availability of the second radio resource for transmission of user data via the second communication path; and controlling flow of user data via the first and second communication paths based on the received information.

In one aspect, the invention provides a method performed by secondary communication apparatus configured to operate as part of a configuration in which communication between a network and a user communication device is split into a first communication path provided via master communication apparatus using a first radio resource and a second communication path provided via the secondary communication apparatus using a second radio resource, different from the first radio resource, the method comprising: generating information indicating availability of the second radio resource for transmission of user data via the second communication path; and transmitting the generated information indicating the availability to the master communication apparatus.

In one aspect, the invention provides a method performed by user communication device configured to operate as part of a configuration in which communication between a network and the user communication device is split into a first communication path provided via first communication apparatus using a first radio resource and a second communication path provided via second communication apparatus using a second radio resource, different from the first radio resource, the method comprising: receiving user data using via the first communication path; receiving user data via the second communication path; generating information indicating availability of the second radio resource for reception of user data via the second communication path; and transmitting the generated information indicating the availability to one of the first communication apparatus and the second communication apparatus.

In one aspect, the invention provides communication apparatus configured to operate as part of a dual connectivity configuration in which a control-plane connection for a user communication device is provided via the communication apparatus and in which a communication bearer between a core network and the user communication device is split at the communication apparatus into a first communication bearer path provided via the communication apparatus using a first radio frequency band and a second communication bearer path provided via another communication apparatus using a second radio frequency band, different from the first radio frequency band, the communication apparatus comprising: means for receiving information indicating availability of the second radio frequency band for transmission of user data using the communication bearer via the second communication bearer path; and means for controlling flow of user data on the communication bearer via the first and second communication bearer paths based on the received information.

In one aspect, the invention provides secondary communication apparatus configured to operate as part of a dual connectivity configuration in which a control-plane connection for a user communication device is provided via master communication apparatus, different from the secondary communication apparatus, and in which a communication bearer between a core network and the user communication device is split at the master communication apparatus into a first communication bearer path provided via the master communication apparatus using a first radio frequency band and a second communication bearer path provided via the secondary communication apparatus using a second radio frequency band, different from the first radio frequency hand, the secondary communication apparatus comprising: means for generating information indicating availability of the second radio frequency band transmission of user data using the communication bearer via the second communication bearer path; and means for transmitting the generated information indicating the availability to the master communication apparatus.

In one aspect, the invention provides a user communication device configured to operate as part of a dual connectivity configuration in which control-plane connection for the user communication device is provided via first communication apparatus and in which a communication hearer between a core network and the user communication device is split at the first communication apparatus into a first communication bearer path provided via the first communication apparatus using a first radio frequency band and a second communication bearer path provided via second communication apparatus using a second radio frequency band, different from the first radio frequency band, the user communication device comprising: means for receiving user data using the communication bearer over the first communication bearer path; means for receiving user data using the communication bearer over the second communication bearer path; means for generating information indicating availability of the second radio frequency band for reception of user data using the communication bearer via the second communication bearer path; and means for transmitting the generated information indicating the availability to one of the first communication apparatus and the second communication apparatus.

In one aspect, the invention provides a system comprising the above described communication apparatus, the above described secondary communication apparatus, and the above described user communication device.

In one aspect, the invention provides a method performed by a communication apparatus configured to operate as part of a dual connectivity configuration in which a control-plane connection for a user communication device is provided via the communication apparatus and in which a communication bearer between a core network and the user communication device is split at the communication apparatus into a first communication bearer path provided via the communication apparatus using a first radio frequency band and a second communication bearer path provided via another communication apparatus using a second radio frequency band, different from the first radio frequency band, the method comprising: receiving information indicating availability of the second radio frequency band for transmission of user data using the communication bearer via the second communication bearer path; and controlling flow of user data on the communication bearer via the first and second communication bearer paths based on the received information.

In one aspect, the invention provides a method performed by secondary communication apparatus configured to operate as part of a dual connectivity configuration in which a control plane connection for a user communication device is provided via master communication apparatus, different from the secondary communication apparatus, and in which a communication bearer between a core network and the user communication device is split at the master communication apparatus into a first communication bearer path provided via the master communication apparatus using a first radio frequency band and a second communication bearer path provided via the secondary communication apparatus using a second radio frequency band, different from the first radio frequency band, the method comprising: generating information indicating availability of the second radio frequency band transmission of user data using the communication bearer via the second communication hearer path; and transmitting the generated information indicating the availability to the master communication apparatus.

In one aspect, the invention provides a method performed by user communication device configured to operate as pail of a dual connectivity configuration in which control-plane connection for the user communication device is provided via first communication apparatus and in which a communication bearer between a core network and the user communication device is split at the first communication apparatus into a first communication bearer path provided via the first communication apparatus using a first radio frequency band and a second communication bearer path provided via second communication apparatus using a second radio frequency band, different from the first radio frequency band, the method comprising: receiving user data using the communication bearer over the first communication bearer path, receiving user data using the communication bearer over the second communication bearer path; generating information indicating availability of the second radio frequency band for reception of user data using the communication hearer via the second communication bearer path; and transmitting the generated information indicating the availability to one of the first communication apparatus and the second communication apparatus.

The invention provides, for all methods disclosed, corresponding computer programs or computer program products for execution on corresponding equipment, the equipment itself (user equipment, nodes or components thereof) and methods of updating the equipment.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described, by way of example only, with reference to the attached figures in which:

DESCRIPTION OF EMBODIMENTS

<Overview>

Figure 1:
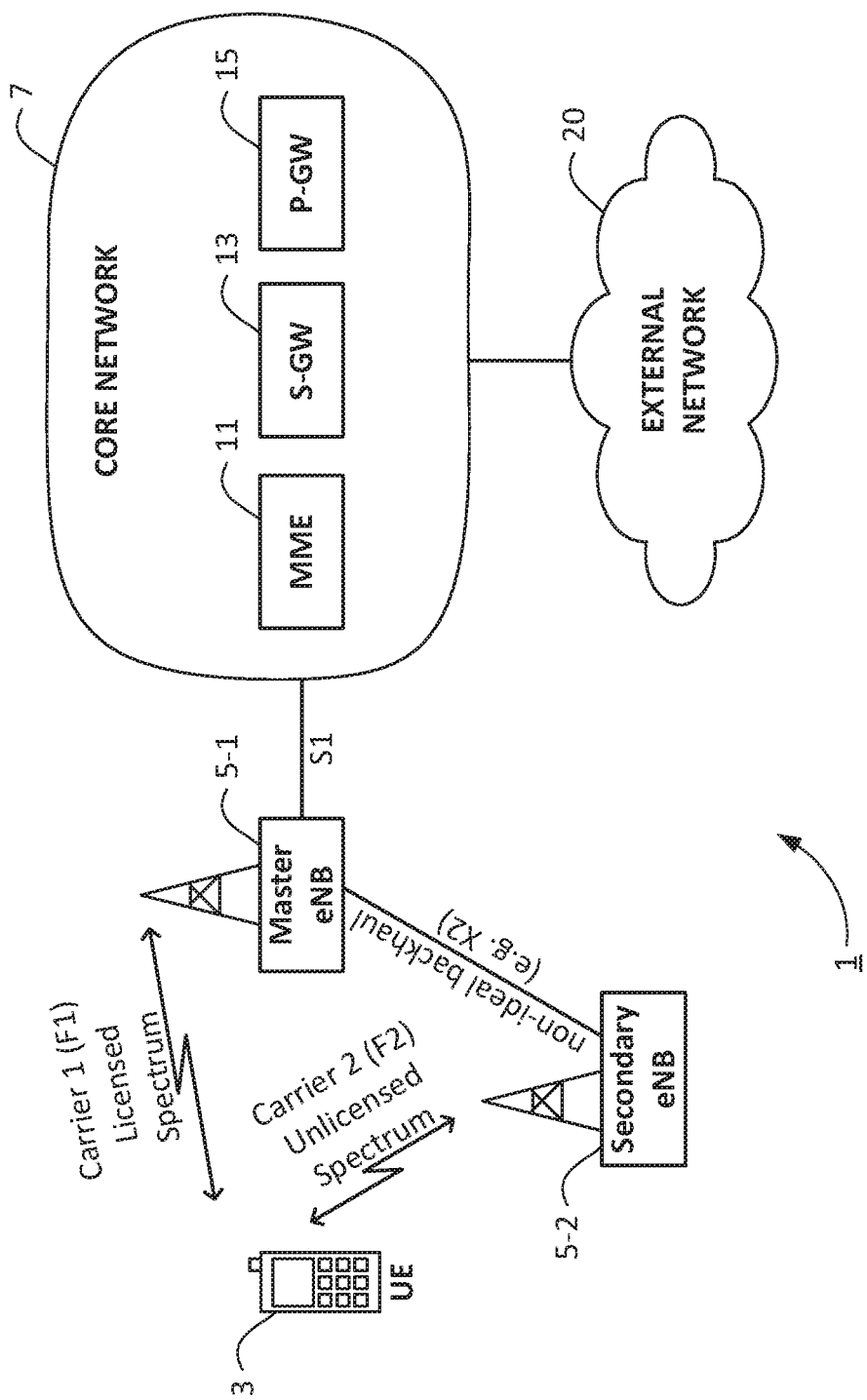
FIG. 1 schematically illustrates a mobile telecommunication system of a type to which the invention is applicable.

FIG. 1 schematically illustrates a mobile (cellular) telecommunication system 1 including a mobile telephone 3 (or other compatible communication device/user equipment) served via base stations 5-1 and 5-2. As those skilled in the art will appreciate, whilst one mobile telephone 3 and two base stations 5 are shown in FIG. 1 for illustration purposes, the system, when implemented, will typically include other base stations and mobile telephones.

A user of the mobile telephone 3 can communicate with other users and/or remote servers via the base stations 5 and a core network 7. The core network 7 comprises, amongst other things, a mobility management entity (MME) 11, a serving gateway (S-GW) 13, and a Packet Data Network (PDN) Gateway (P-GW) 15.

The MME 11 manages general mobility aspects of the mobile telephone 3 and ensures that connectivity is maintained with the mobile telephone 3 as it is moving within the geographical area covered by the communication system (and/or as the mobile telephone 3 is handed over between base stations of the communication system). The MME 11 also handles control-plane signaling for the mobile telephone 3 and manages the various bearers associated with the mobile telephone 3 (e.g. such as an Evolved Packet System (EPS) bearer and/or a radio bearer) e.g by controlling the S-GW 13 and the P-GW 15 (and/or possibly other network nodes) via which such bearers are provided.

The S-GW 13 provides a connection between the mobile telephone 3 and the core network 7 (via the base station 5-1) for sending and receiving user plane data over an associated communication bearer (e.g. an EPS bearer). The communication bearer normally terminates at the P-GW 15, although it is often complemented by an external bearer as well (for example, another EPS bearer and/or the like) between the P-GW 15 and a communication end-point outside the core network 7 (e.g. in an external network 20). It will be appreciated that, whilst shown as separate entities, the functionalities of the S-GW 13 and the P-GW 15 could be implemented in a single gateway element.

As will he understood by those skilled in the art, each base station 5 operates one or more base station cells (not shown) in which communications can be made between the base station 5 and the mobile telephone 3 using one or more suitable communication links (e.g. radio links) provided between the mobile telephone 3 and the respective serving base station 5. Each of the communication links may be carried over one or more associated component carriers (F1, F2).

In this system, a dual connectivity service is provided to compatible user equipment (such as the mobile telephone 3) using split bearer configuration (e.g. as specified in 3GPP TR 36.842). In the case of dual connectivity, one of the base stations is configured as a master base station (MeNB) 5-1 and the other base station is configured as a secondary base station (SeNB) 5-2. The base stations 5 are connected to each other via an appropriate base station to base station communication interface (e.g. an 'X2' interface). In this example, the base stations 5 are connected to each other using a non-ideal backhaul.

The MeNB 5-1 is configured to provide a primary component carrier F1 in the licensed spectrum and the SeNB 5-2 is configured to provide a secondary component carrier F2 that is in the unlicensed spectrum and is therefore subject to the so called listen-before-talk (LBT) requirements, in order to provide fair and efficient co-existence.

The MeNB 5-1 is connected to the core network 7 via an S1 interface in order to provide both user-plane ('S1-U') communication via the S-GW 13 (for MeNB-split bearers) and control-plane ('S1-MME') communication with the MME 11 (for all bearers). Although in FIG. 1 the SeNB 5-2 is shown not to be connected to the core network 7 directly, it may also be connected indirectly, e.g. via the external network 20. Although not shown in FIG. 1, the SeNB 5-2 has user-plane ('S1-U') connectivity via the MeNB 5-1 over the non-ideal backhaul.

The mobile telephone 3 may be configured with multiple communication bearers (for example, a first communication bearer for voice, a second communication bearer for video, a third communication bearer for internet data, etc.), e.g. in order to provide different transmission priorities for different services. Each communication bearer (and each data packet sent over the communication bearers) is associated with an appropriate quality of service (QoS) identifier, such as a QoS class indicator (QCI) value, in order ensure that the appropriate transmission priorities can be met regardless whether such communication bearers are provided via the MeNB 5-1, the SeNB 5-2, or both. Data associated with one of the mobile telephone's 3 communication bearers may be transmitted on the same radio link/carrier (although data for different bearers may be transmitted over different radio links/carriers).

In this system, the base stations 5-1, 5-2 (and the mobile telephone 3) are configured for dual connectivity using a split bearer, that is data packets are transmitted to the mobile telephone 3 over a communication bearer via a first communication bearer path provided by MeNB 5-1 and/or via a second communication bearer path provided by the SeNB 5-2. In this particular example, the splitting of the communication bearer is in the PDCP entity of the MeNB 5-1. Thus, PDCP, RLC, MAC and PHY functionalities for the split bearer are provided in the MeNB 5-1, while RLC, MAC and PHY functionalities for the communication bearer are provided in the SeNB 5-2, for example. When a downlink data packet is received by the MeNB 5-1 it performs appropriate processing of the data packet. For example, the MeNB 5-1 may route the data packet from the PDCP layer of the MeNB 5-1 to the SeNB 5-2 for transmission towards the mobile telephone 3, or pass the data packet from the PDCP layer to the lower layers for transmission towards the mobile telephone 3.

Advantageously, the MeNB 5-1 is configured to determine which of the base stations 5-1, 5-2 is to transmit data packets towards the mobile telephone based on information indicating availability of a communications channel on component carrier F2. Beneficially, in order to facilitate this action by the MeNB 5-1, information identifying the availability of the channel is provided by the SeNB 5-2.

For example, the SeNB 5-2 may detect the availability of a communications channel on the carrier F2 and provide feedback to the MeNB 5-1 in the form of a value of an available buffer size. Specifically, the SeNB 5-2 reports the available buffer size corresponding to the UE 3 as '0' if the communications channel on carrier F2 is unavailable, and reports the available buffer size corresponding to the UE 3 as a non-zero value if the channel is available. In this particular example, the base station 5-2 uses the DL DATA DELIVERY STATUS frame as described in TS 36.425 (see Table 1 below) for this purpose and more specifically one, or both, of the two parts ('information elements (IEs)') of that frame reserved for a "desired buffer size" (e.g. the "Desired buffer size for the E-RAB" and/or the "Minimum desired buffer size for the UE"). Where the Desired buffer size for the E-RAB IE is used this effectively informs the MeNB 5-1 of the availability of a communication channel for a specific E-RAB and UE (i.e. on a per UE and per E-RAB basis) and where the Minimum desired buffer size for the UE IE is used this effectively informs the MeNB 5-1 of the availability of a communication channel for a specific UE (i.e. on a per UE and per E-RAB basis). Effectively, therefore, use of the Desired buffer size for the E-RAB IE provides a finer granularity because it can individually provide channel status information for each respective E-RAB provided via the UE whereas use of the Minimum desired buffer size for the UE IE provides a coarser granularity for a whole UE.

TABLE 1

DL DATA DELIVERY STATUS (PDU Type 1) Format

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | | Final Frame Ind. | Lost Packet Report | 1 |
| Highest successfully delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 4* (Number of reported lost X2-u SN ranges) |
| End of lost X2-U Sequence Number range | | | | | | | | |
| Spare extension | | | | | | | | 0-4 |

The MeNB 5-1 is also configured to start a timer upon receiving the availability information. The timer has a predetermined time period. Before expiry of the predetermined time period, the availability information is considered to be valid. After expiry of the predetermined time period, the availability information is considered to be invalid. Thus, when the information provided by the SeNB 5-2 indicates that the communications channel on carrier F2 is unavailable, the MeNB 5-1 can perform flow control procedures during the predetermined time period. In one advantageous example, the flow control procedure performed by the MeNB 5-1 when the carrier F2 is unavailable includes stopping the transmission of further data to the base station 5-2. Furthermore, the MeNB 5-1 can beneficially instruct the SeNB 5-2 to not transmit packets which have already been sent to the SeNB 5-2 and which are buffered in a transmission queue for transmission to the UE 3. Moreover, the MeNB 5-1 can itself transmit these packets to the UE 3.

In summary, it is possible to ensure that the flow of data via the MeNB or SeNB can be suitably controlled based on the availability of a communications channel on the carrier F2 in the unlicensed spectrum for transmission of data by the SeNB 5-2 to the UE 3. Accordingly, the user experience can be enhanced by a reduction or elimination of delays associated with channel allocation and/or scheduling on the secondary carrier F2 in the unlicensed spectrum.

<Mobile Telephone>

Figure 2:
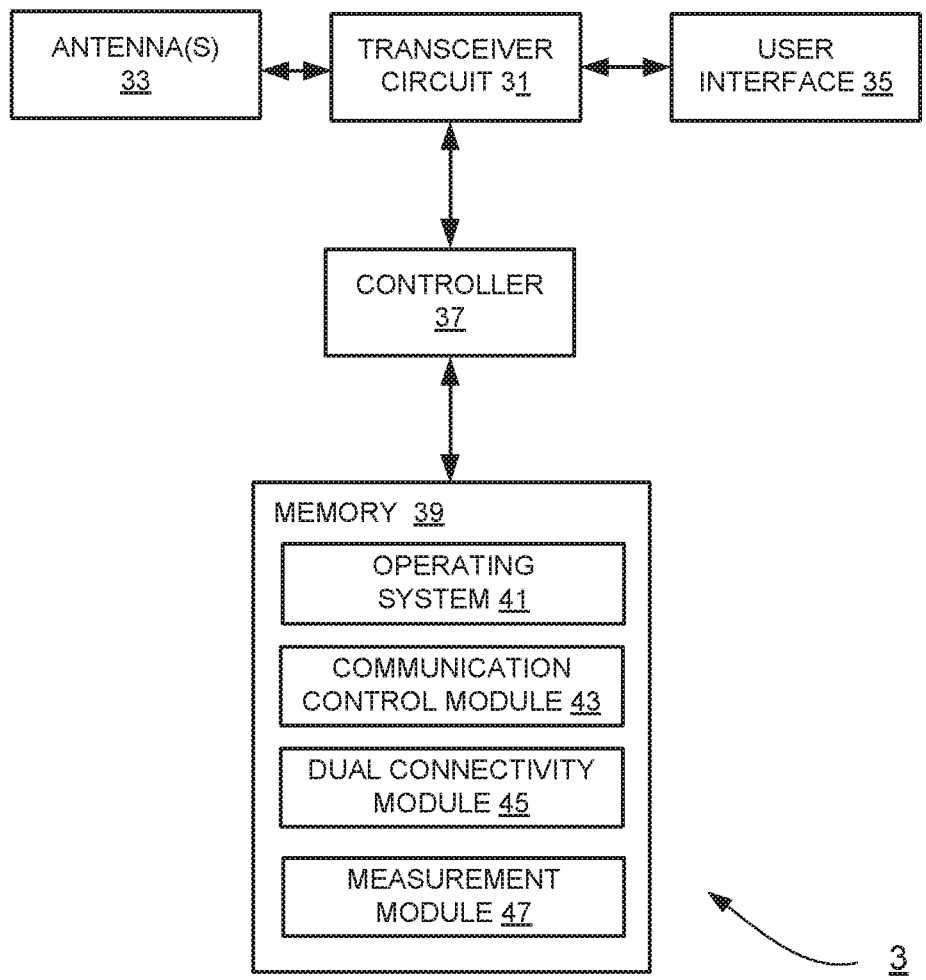
FIG. 2 is a block diagram illustrating the main components of the mobile telephone forming part of the system shown in FIG. 1.

FIG. 2 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 2, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within the memory 39. As shown, these software instructions include, among other things, an operating system 41, a communications control module 43, a dual connectivity module 45, and a measurement module 47.

The communications control module 43 controls communications between the mobile telephone 3 and the base station(s) 5. The communications control module 43 also controls the separate flows of uplink data and downlink data and control data to be transmitted to the base station 5 (and other nodes, e.g. the MME 11, via the base station 5).

The dual connectivity module 45 coordinates (with assistance by the communications control module 43) communications over the split communication bearer forming part of a dual connectivity service. The dual connectivity module 45 also controls communications with the MeNB 5-1 over the associated carrier F1 and communications with the SeNB 5-2 over the associated carrier F2.

The measurement module 47 measures noise level and/or an interference level on physical resources. In one example described below this is used, by the measurement module 47, to determine a status of the communication channel for example whether or not the channel is busy. This status can then be reported either to the SeNB 5-2 or the MeNB 5-1. The UE 3 may, for example, report that the channel is busy (unavailable) to the SeNB 5-2 by sending a channel quality indicator (CQI) with an Out-Of-Range (OOR) value, or any other suitable means. The SeNB 5-2 can use this as assistance information and provide channel availability information to the MeNB 5-1 based on any of other methods described herein. Alternatively, or in addition, the UE 3 may report a channel status directly to the MeNB 5-1. For example, if the UE 3 is aware of resource allocation of the SeNB 5-2 and determines that noise or interference received on physical resources originates from neighbouring devices, the UE 3 can report to the MeNB 5-1 that the channel is busy (and hence unavailable). Alternatively, the UE 3 can report interference or noise levels from multiple sources (including SeNB 5-2 transmissions) to the MeNB 5-1 so that the MeNB 5-1 can determine that the UE 3 is not scheduled on the carrier F2 and control the flow of data via the MeNB 5-1.

<Master Base Station>

Figure 3:
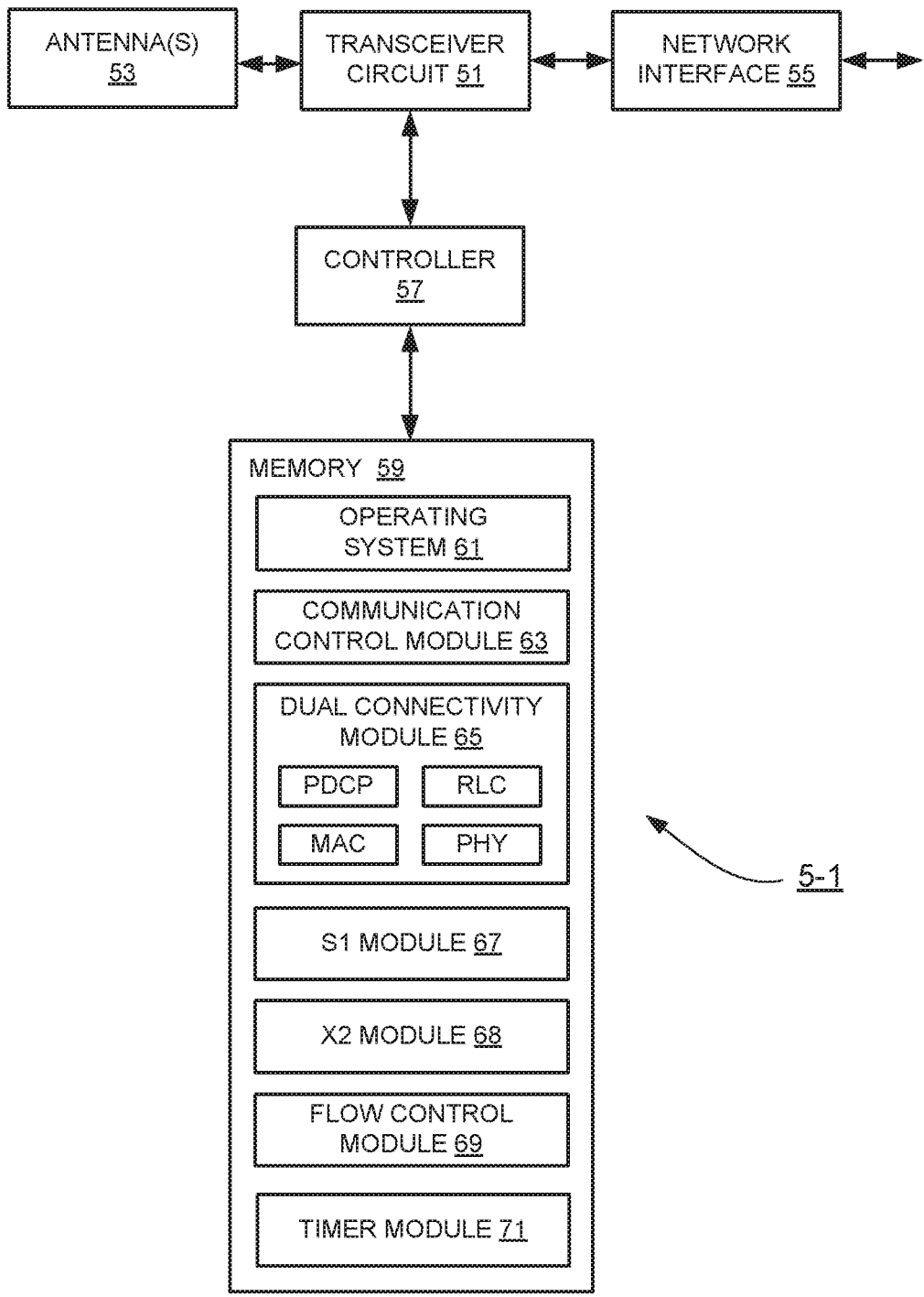
FIG. 3 is a block diagram illustrating the main components of the master base station forming part of the system shown in FIG. 1.

FIG. 3 is a block diagram illustrating the main components of a master base station 5-1 shown in FIG. 1. The master base station 5-1 is a communications node providing services to user equipment 3 within its coverage area. In the exemplary embodiments according to the invention, communications between the various base stations 5 and the mobile telephone 3 are coordinated. As shown, the master base station 5-1 includes a transceiver circuit 51 which transmits signals to, and receives signals from, the mobile telephone 3 via at least one antenna 53. The master base station 5-1 also transmits signals to and receives signals from the core network 7 and other neighbouring base stations (e.g. the SeNB 5-2) via a network interface 55 (X2/non-ideal backhaul interface for communicating with neighbouring base stations and S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an S1 module 67, an X2 module 68, a flow control module 69 and a timing module 71.

The communications control module 63 controls communications between the master base station 5-1 and the SeNB 5-2, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the PDCP, RLC, MAC, and PHY entities (layers) responsible for communicating data packets (that belong to MeNB-specific bearers) via the base station 5-1 when it is configured as an MeNB. The dual connectivity module 65 is also responsible for communicating data packets of the split bearer to the SeNB 5-2.

The S1 module 67 handles S1 signalling (e.g. generates, sends, and receives messages/PDUs formatted in accordance with the S1 protocol) between the base station 5 and the core network 7 entities (such as the MME 11 and the S-GW 13). For example, the S1 module 67 is responsible for receiving downlink data packets from the core network 7 and passing the received data packets to the dual connectivity module 65 (via the PDCP entity), when the base station 5-1 is configured to operate as an MeNB.

The X2 module 68 handles X2 signalling (e.g. generates, sends, and receives messages/PDUs formatted in accordance with the X2 application protocol) between the master base station 5 and other base stations, such as the secondary base station 5-2. For example, the X2 module 68 is responsible for exchanging, with the corresponding X2 module of the secondary base station 5-2, signalling (e.g. control signaling and/or data packets) relating to the SeNB-specific bearer.

The flow control module 69 receives information indicating availability of a communications channel on the carrier F2 for the split communication bearer from the SeNB 5-2, i.e., for the communication bearer path between the SeNB 5-2 and the mobile telephone 3. For example, the base station 5-2 may detect the availability of the channel and provide feedback to the base station 5-1 in the form of a value of an available buffer size. Specifically, in one example, the base station 5-2 reports the available buffer size corresponding to the UE 3 as '0' if the channel on carrier F2 is unavailable, and reports the available buffer size corresponding to the UE 3 as a non-zero value if the channel on carrier F2 is available. In this particular case, the base station 5-2 uses the DL DATA DELIVERY STATUS frame (e.g. as illustrated in Table 1) for this purpose.

The flow control module 69 is responsible for ensuring that an appropriate communication bearer path is used for the data packets transmitted for each items of user equipment (such as the mobile telephone 3) served by this base station and the other base station. Specifically, the flow control module 69 uses the information received by the flow control module 69 to perform flow control. In particular, when the information received from the base station 5-2 indicates that the communications channel on carrier F2 is unavailable the flow control module 69 prevents the transmission of further packets to the base station 5-2. The flow control module 69 also generates an instruction, which is transmitted to the base station 5-1, to not transmit packets which have already been sent to the base station 5-2 and which are buffered in a transmission queue for transmission to the UE 3. Moreover, the flow control module 69 controls the base station 5-1 to transmit these packets to the UE 3.

The timer module 71 commences timing when the information from the base station 5-2 is received. The timing is performed for a predetermined time period during which the information provided by the base station 5-2 is considered to be valid. The flow control module 69 performs flow control as described above during the predetermined time period when the information provided by the base station 5-2 indicates that the channel on carrier F2 is unavailable.

<Secondary Base Station>

Figure 4:
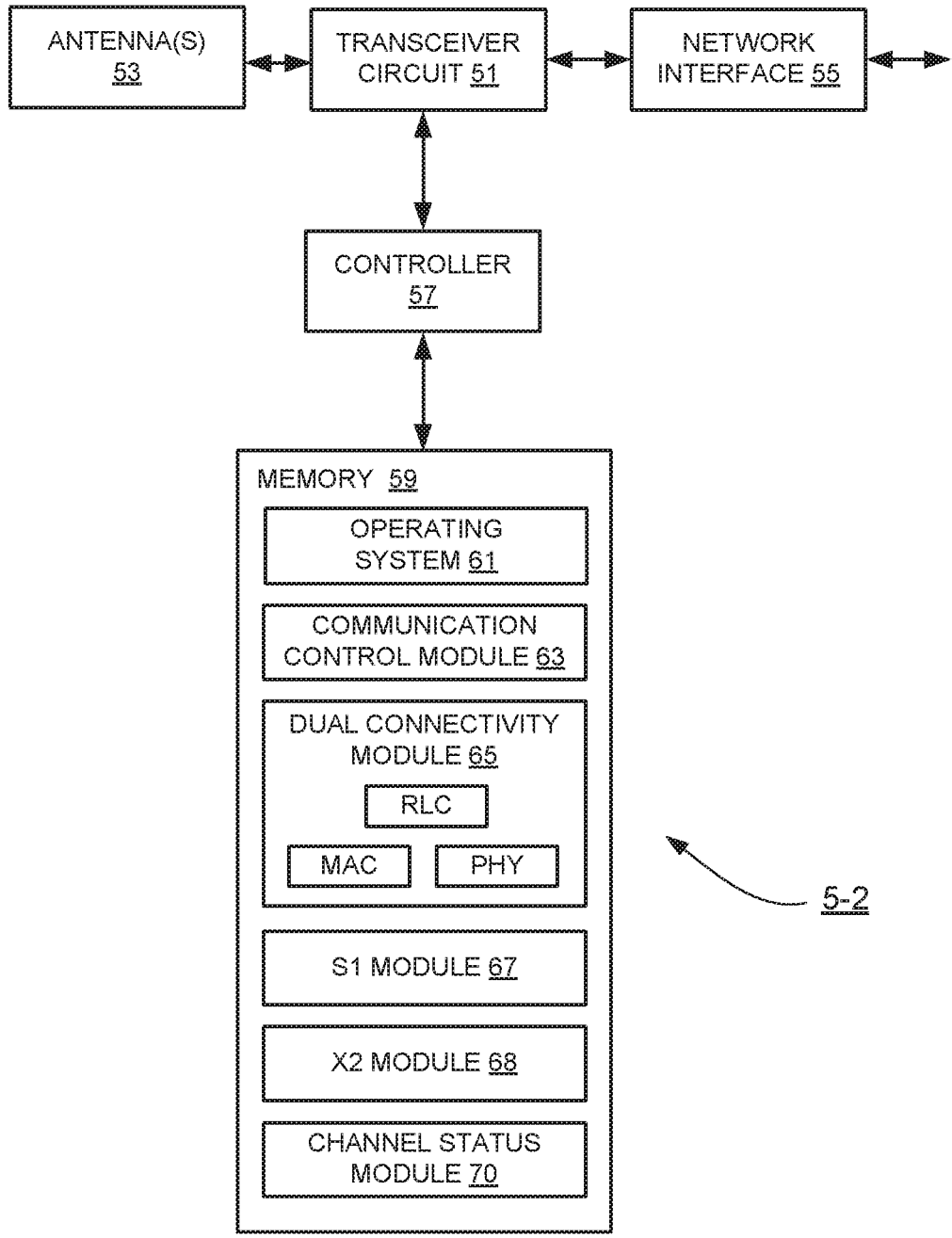
FIG. 4 is a block diagram illustrating the main components of the secondary base station forming part of the system shown in FIG. 1.

FIG. 4 is a block diagram illustrating the main components of the secondary base station 5-2 shown in FIG. 1. The secondary base station 5-2 is a communications node providing services to user equipment 3 within its coverage area. As shown, the secondary base station 5-2 includes a transceiver circuit 51 which transmits signals to, and receives signals from, the mobile telephone 3 via at least one antenna 53. The secondary base station 5-2 also transmits signals to and receives signals from the core network 7 and other neighbouring base stations (e.g. the MeNB 5-1) via a network interface 55 (X2/non-ideal backhaul interface for communicating with neighbouring base stations and an optional S1 interface for communicating with the core network 7). The operation of the transceiver circuit 51 is controlled by a controller 57 in accordance with software stored in memory 59. The software includes, among other things, an operating system 61, a communications control module 63, a dual connectivity module 65, an S1 module 67, an X2 module 68, and a channel status module 70.

The communications control module 63 controls communications between the secondary base station 5-2 and the MeNB 5-1, the mobile telephone 3, and the core network devices.

The dual connectivity module 65 coordinates communications over the communication bearer (or bearers) forming part of a dual connectivity service for the mobile telephone 3 served by this base station.

The dual connectivity module 65 includes the RLC, MAC, and PHY entities (layers) responsible for communicating data packets via the base station 5-2 when it is configured as an SeNB for dual connectivity split bearer. In this particular split bearer SeNB configuration, the dual connectivity module 65 does not include a PDCP entity.

The S1 module 67 handles S1 signalling (e.g. generates, sends, and receives messages/PDUs formatted in accordance with the S1 protocol) between the base station 5 and the core network 7 entities (such as the MME 11 and the S-GW 13).

The X2 module 68 handles X2 signalling (e.g. generates, sends, and receives messages/PDUs formatted in accordance with the X2 application protocol) between the secondary base station 5-2 and other base stations, such as the master base station 5-1. For example, the X2 module 68 is responsible for exchanging, with the corresponding X2 module of the master base station 5-1, signalling (e.g. control signalling) relating to the SeNB-specific bearer.

The channel status module 70 detects availability of the communications channel on carrier F2. The communications control module 63 then provides feedback to the base station 5-1 as described earlier for example.

In the above description, the mobile telephone 3 and the base stations 5 are described for ease of understanding as having a number of discrete modules (such as the communications control modules and the dual connectivity modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<Operation>

A number of different examples will now be described that illustrate how the invention can be put into effect using the mobile telephone 3 and the base stations 5 (as exemplary dual connectivity network points) of FIG. 1. As discussed above, dual connectivity service can be provided by configuring the mobile telephone 3 to communicate with both the MeNB 5-1 and at least one SeNB 5-2, using a split communication bearer.

Figure 5:
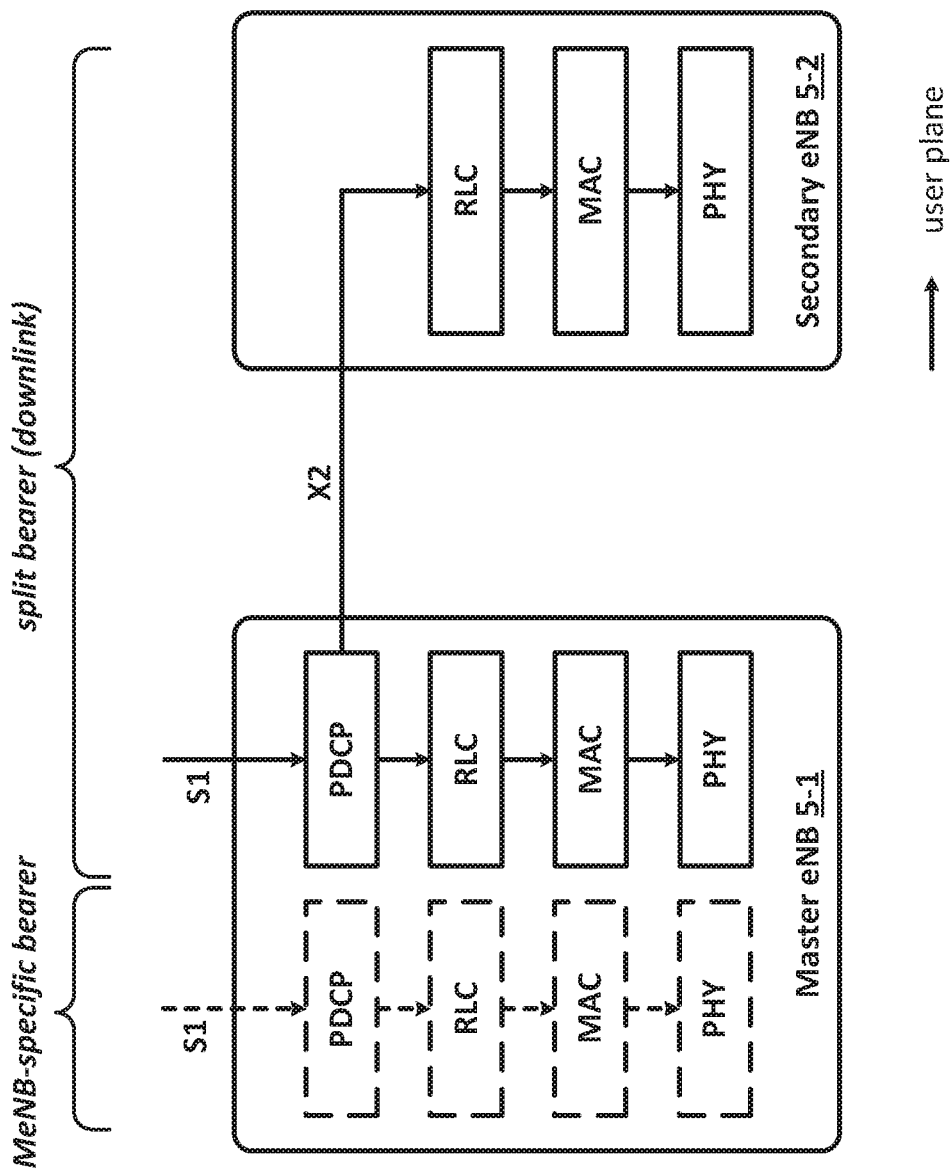
FIG. 5 illustrates an exemplary way in which dual connectivity can be provided in the system shown in FIG. 1 using a split bearer.

FIG. 5 illustrates (using continuous lines) an exemplary bearer configuration for the provision of one particular split bearer configuration (namely Alternative 3C. Other alternatives are also contemplated of course). For comparison, FIG. 5 also illustrates (using dashed lines) an MeNB-specific bearer, the description of which is omitted herein for the sake of simplicity. In FIG. 5, some of the protocol layers and functions (e.g. control-plane) implemented by the base stations 5 are also omitted. Whilst FIG. 5 illustrates the downlink direction only (as indicated by the arrows), a similar bearer configuration may be realised for the uplink direction as well, e.g. by reversing the direction of data transmissions, where appropriate.

In the split bearer configuration depicted in FIG. 5, the S1 control-plane (e.g. 'S1-MME') for the mobile telephone 3 is provided by the MeNB 5-1. User-plane communication (e.g. a communication hearer that is associated with carrier F2 of FIG. 1) is provided for the mobile telephone 3 via the SeNB 5-2 with involvement of the MeNB 5-1. In particular, downlink data packets can be sent from a remote endpoint over an associated communication bearer through the core network 7 (e.g. via the S-GW 13) and received at the PDCP layer of the MeNB 5-1. The communication bearer is split at the PDCP, with data packets either forwarded to the lower layers (i.e. the RLC, MAC, and PHY layers) of the MeNB 5-1 for transmission to the mobile telephone 3 (using carrier F1), or routed to the RLC layer of the SeNB 5-2 before they are transmitted to the mobile telephone 3 over the PHY layer of the SeNB 5-2 (using carrier F2).

EXAMPLE 1

First Example

Figure 6:
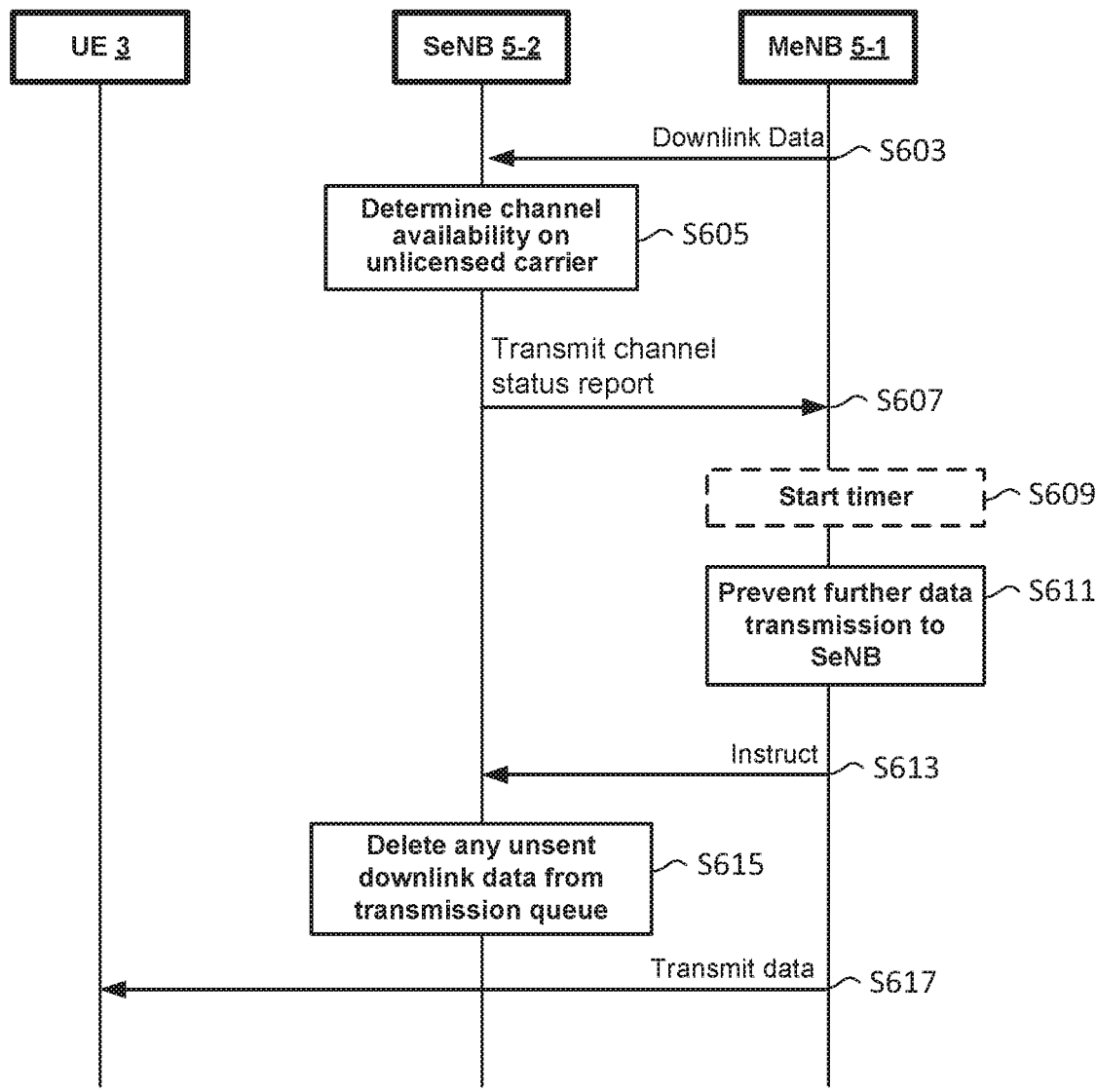
FIG. 6 is an exemplary timing diagram illustrating a procedure performed by elements of the mobile telecommunication system.

FIG. 6 is an exemplary timing diagram illustrating a procedure performed by elements of the mobile telecommunication system 1 in which the SeNB 5-2 determines channel availability for a particular the mobile communication device 3 and reports it to the MeNB 5-1 which then performs appropriate flow control.

The procedure occurs when the MeNB 5-1 is transmitting downlink data to the SeNB 5-2 for onward transmission to a mobile communication device (shown as user equipment 'UE') 3, as illustrated at step S603. At step S605, the SeNB 5-1 determines the availability of the communications channel for that mobile communication device 3 on carrier F2 for transmission of data packets. Then, at step S607, the SeNB 5-1 transmits a status report to the MeNB 5-1. For example, if the channel on carrier F2 is busy or unavailable, the SeNB 5-2 transmits a DL DATA DELIVERY STATUS frame to the MeNB 5-1 with the value of the available buffer size set to '0'. On the other hand, if the channel on carrier F2 is available, the SeNB 5-2 transmits a DL DATA DELIVERY STATUS frame to the MeNB 5-1 with the value of available buffer size as non-zero. The MeNB 5-1 performs flow control for that mobile communication device 3 based on the received information. For example, if the channel for that mobile communication device 3 on carrier F2 is available the MeNB 5-1 may continue to send data to that mobile communication device 3 via the SeNB 5-2 (not shown). However, if the carrier F2 is unavailable the MeNB 5-1 stops sending further packets to SeNB 5-2 (step S611). At step S613, the MeNB 5-1 instructs the SeNB 5-2 not to transmit data to the mobile communication device 3 which has already been sent to the SeNB 5-2 but not transmitted to the mobile communication device 3. In response to receiving the instruction, the SeNB 5-2 deletes the data from its transmission queue at step S615. At step S617, the MeNB 5-1 itself sends the data to the mobile communication device 3. It will be appreciated that order of steps S611, S613 and S617 can be rearranged.

Steps S611, S613 and S617 can be performed at the expiry of a predetermined time period that commences upon receipt of the channel status report. Thus, a timer can be set at step S609.

EXAMPLE 2

Second Example

Figure 7:
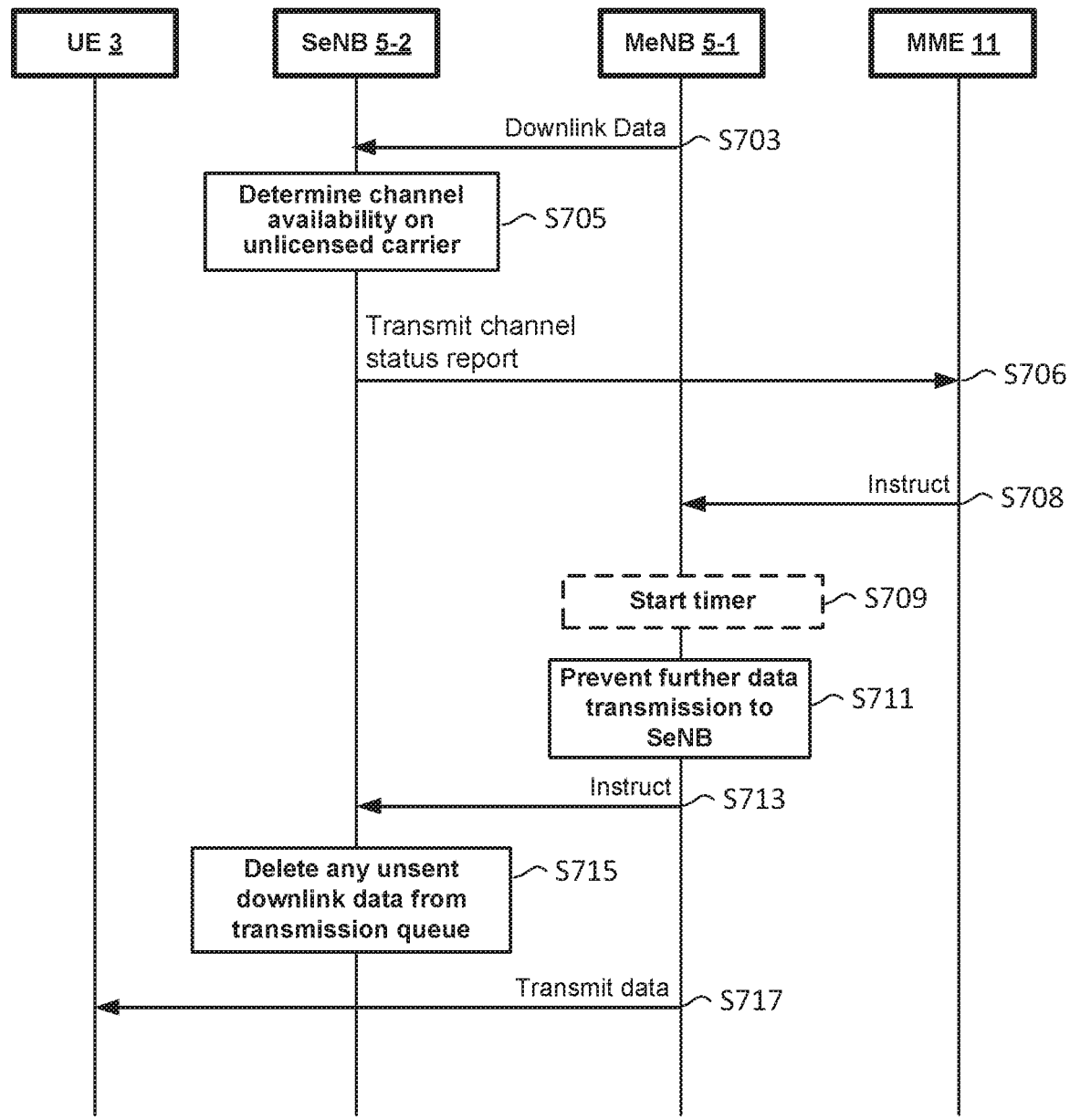
FIG. 7 illustrates a modification of the procedure shown in FIG. 6.

FIG. 7 illustrates a modification of the procedure shown in FIG. 6 in which the SeNB 5-2 determines channel availability for a particular the mobile communication device 3 and reports it to the core network 7 (e.g. the MME 11 or S-GW 13), rather than the MeNB 5-1, and it is an entity in the core network 7 which initiates the performance of appropriate flow control. In this case, steps S703, S705, S709, S711, S713, S715 and S717 correspond to S603, S605, S609, S611, S613, S615 and S617, respectively, thus their description is omitted herein.

However, in this example, the SeNB 5-2 reports the availability of the channel on carrier F2 to the S-GW or MME (EPC) or S1-GW at step S706 instead of to the MeNB 5-1 as in the first embodiment (albeit possibly using different signalling). Then, at step S708, the MME 11 instructs the MeNB 5-1 to perform flow control, for example to increase or decrease DL packet transmission via the SeNB. In particular, the when the channel report status indicates that the carrier F2 is unavailable, the S-GW or MME (EPC) or S1-GW can instruct the MeNB 5-1 to reduce the throughput to the SeNB 5-2.

EXAMPLE 3

Third Example

Figure 8:
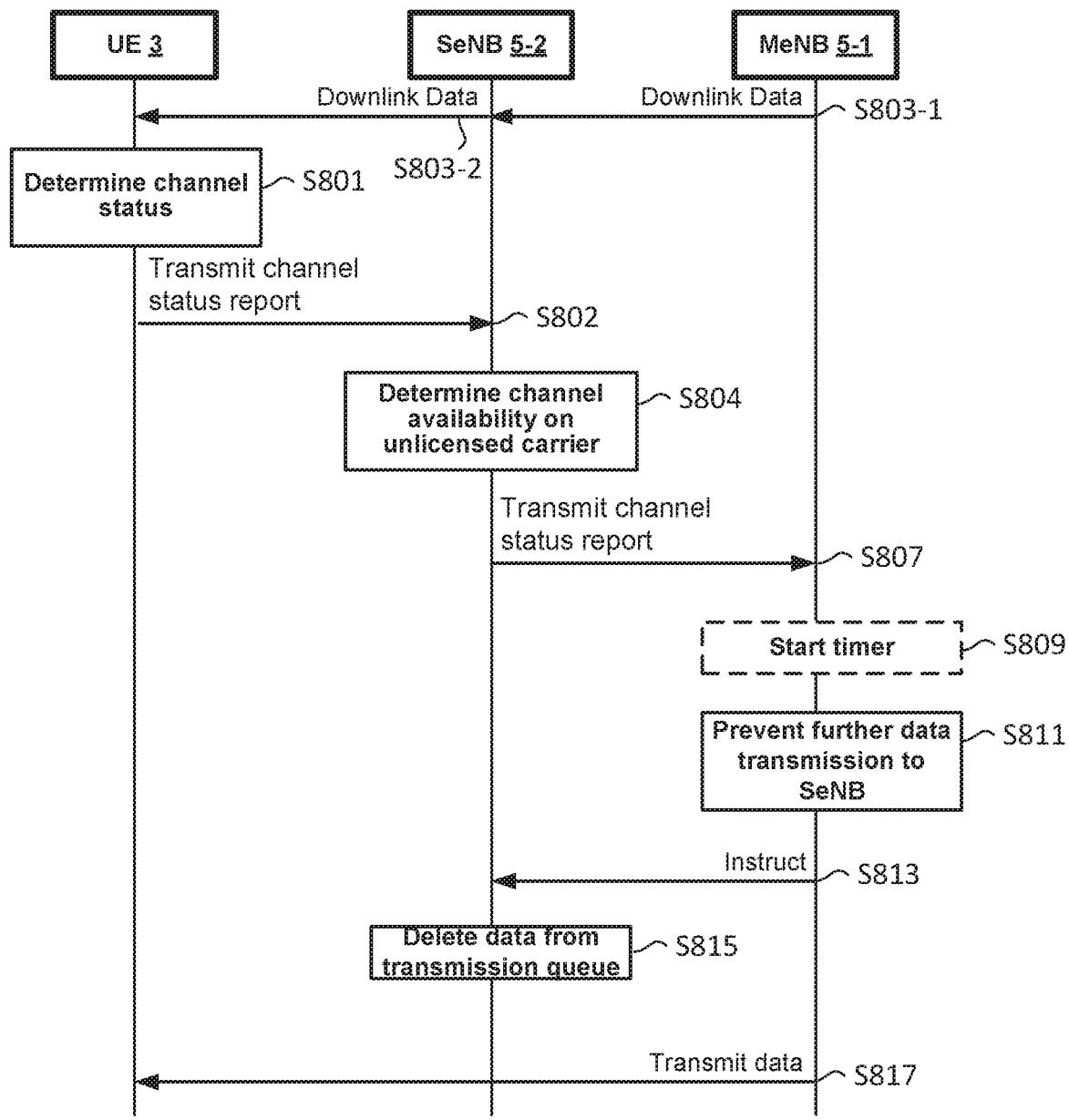
FIG. 8 illustrates another modification of the procedure shown in FIG. 6.

FIG. 8 illustrates another exemplary modification of the procedure shown in FIG. 6 in which the mobile communication device 3 provides information to the SeNB 5-2 to assist the SeNB 5-2 to determine channel availability for that mobile telephone 3 for reporting to the MeNB 5-1 which then performs appropriate flow control.

In this case, steps S807, S809, S811, S813, S815 and S817 correspond to S607, S609, S611, S613, S615 and S617, respectively, thus their description is omitted herein.

In this example, the mobile communication device 3 receives downlink data via the MeNB 5-1 and SeNB 5-2 (steps 803-1 and 803-2). Then at step S801, the mobile communication device 3 determines the status of the downlink communication channel on the carrier F2 and reports a channel status to the SeNB 5-2 at step S802 for use as assistance information. For example, the determination can be based on a measurement of a noise level or interference level on physical resources and the mobile communication device 3 may report the carrier busy status by sending a carrier quality indication (CQI) with the value set appropriately (e.g. to 'OOR') (or using any other suitable mechanism). At step S804, the SeNB 5-2 uses this as assistance information to assist a determination of channel availability and provides the resulting channel availability to the MeNB 5-1 as described with reference to FIG. 6.

EXAMPLE 4

Fourth Example

Figure 9:
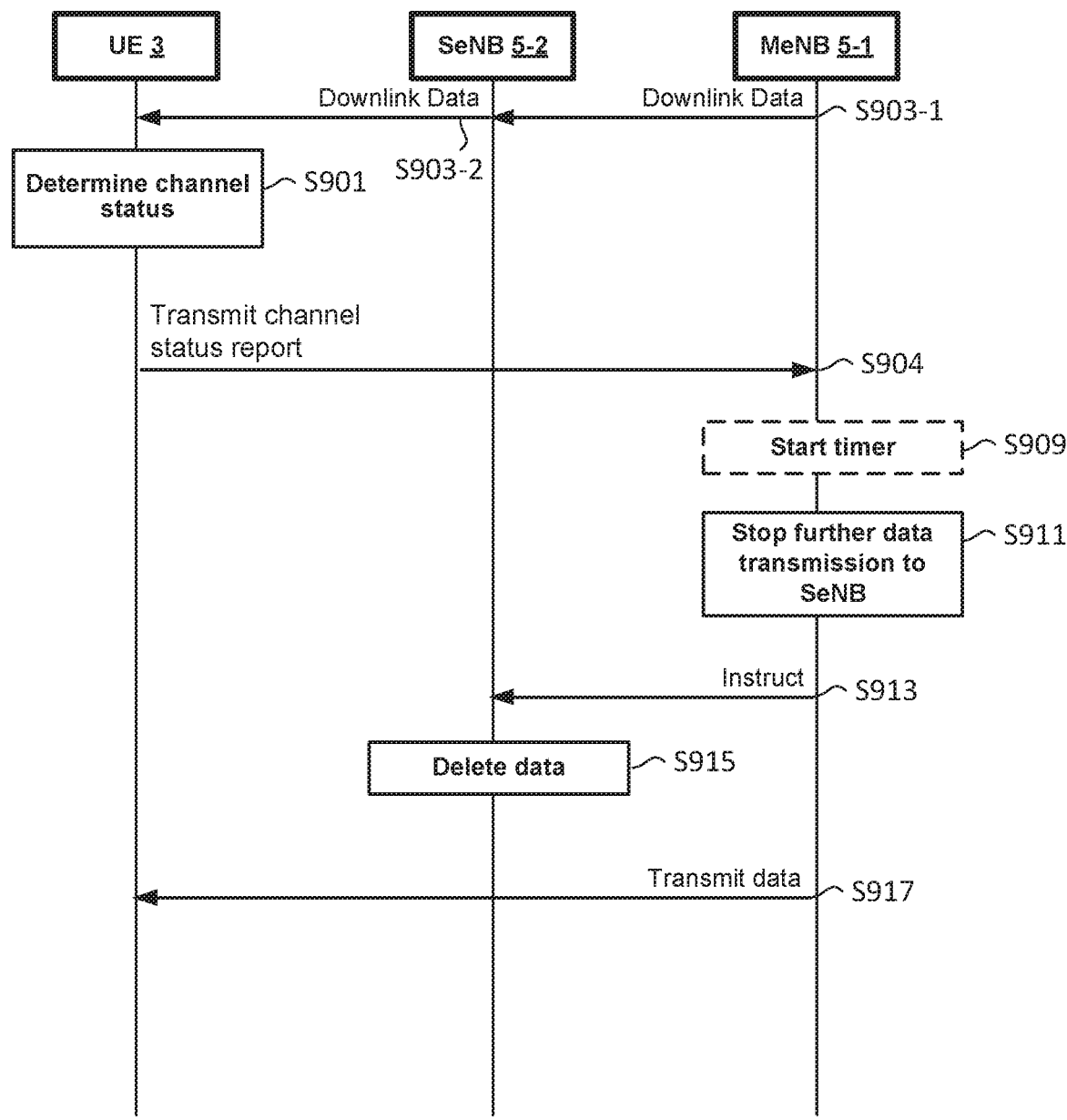
FIG. 9 illustrates another modification of the procedure shown in FIG. 6.

FIG. 9 illustrates another exemplary modification of the procedure shown in FIG. 6 which is similar to the example of FIG. 8 but in this case the mobile communication device 3 provides channel status information directly to the MeNB 5-1 rather than SeNB 5-2.

In this case, S909, S911, S913, S915 and S917 correspond to S609, S611, S613, S615 and S617, respectively, thus their description is omitted. herein for brevity and clarity.

In this example, the mobile communication device 3 receives downlink data via the MeNB 5-1 and SeNB 5-2 (steps 903-1 and 903-2). Then at step S901, the mobile communication device 3 determines the status of the downlink communication channel on the carrier F2 and reports a channel status to the MeNB 5-1 at step S904. For example, if the mobile communication device 3 is aware of resource allocation made by the SeNB 5-2 and determines that noise or interference received on physical resources originates from neighbouring devices, the mobile communication device 3 reports the channel as being busy (and hence unavailable) to the MeNB 5-1. Alternatively, the mobile communication device 3 can report interference or noise levels from multiple sources (including SeNB 5-2 transmissions) to the MeNB 5-1 so that the MeNB 5-1 can determine that the mobile communication device 3 should not be scheduled on the unlicensed channel on carrier F2. The MeNB 5-1 can then perform flow control as described with reference to FIG. 6.

<Modifications and Alternatives>

Detailed exemplary embodiments have been described above. As those skilled in the art will appreciate, a number of modifications and alternatives can be made to the above embodiments whilst still benefiting from the inventions embodied therein.

In the above examples, the base station 5-2 is configured as an eNB. However, it may alternatively be an access point of a wireless local area network.

In the above exemplary embodiments, the communication bearer is split in the PDCP entity of the MeNB. However, the communication bearer may be split above the PDCP layer (IP packet), or in or above the MAC layer (CA architecture).

In the above examples the channel availability is determined and reported for each item of user equipment (i.e. on a per UE basis). It will be appreciated that the availability of the unlicensed carrier may be reported per node (i.e. for all UEs served by the base station) as opposed to per UE. In this case per UE fairness is maintained by the secondary base station. In this variation, the secondary base station detects/listens to the channel status on the unlicensed carrier(s), and reports the status to master base station. If the unlicensed channel becomes busy/unavailable then the secondary base station reports that the availability of this carrier is 'false' to the master base station. If the channel becomes not busy/available then the secondary base station reports that the availability of this carrier is 'true'. In this case the report of carrier availability may be in a form similar to the reporting of eNB resource status measurements.

Examples of resource reporting initiation procedures used by an eNB to request measurements from another eNB are described, for example, in section 20.2.2.10 of TS 36.300 and Section 8.3.6 of TS 36.423, the contents of which are incorporated herein by reference. The reporting of channel availability by the secondary base station to the master base station can be implemented using such kind of resource reporting procedures. For example, the master base station can request unlicensed spectrum availability from the secondary base station, and the secondary base stations replies with an unlicensed spectrum availability status response. However, instead of a request by the master base station, the reporting could be periodic or event triggered (e.g., when one or other of the buffers has been filled up). Furthermore, the reporting could be a combination of periodic and event triggered (e.g., when the buffer is filled up then report periodically until the time buffer is below the threshold). In this approach, the reporting is per node rather than per UE or per E-RAB.

In a variation of this, the secondary base station may report the availability of the channel to the master base station on a per UE basis (e.g. by using a buffer status of zero to report channel unavailability as described with reference to FIG. 6 and elsewhere above) and carrier availability on a per node basis. This combination is advantageous because it allows the master base station to determine whether a buffer status of zero has arisen as a result of a genuine full buffer or because the channel has become available. If the master base station determines that the buffer status of zero has arisen as a result of the channel becoming available it can apply flow control as described previously.

In at least some of the above examples, availability of a channel on the unlicensed carrier is detected by the secondary base station and this information is passed on to a master base station which then performs associated flow control. However, the secondary base station may alternatively or additionally estimate a time at which the channel is next available and provide this information to the master base station instead of information identifying whether or not the channel is available. The master base station may then perform associated flow control by planning the next scheduling cycle for the secondary base station based on the received timing information for example by ensuring that downlink data is not routed via the secondary base station until the estimated time at which the channel becomes available.

Similarly, the secondary base station may alternatively or additionally estimate a probability of channel availability (e.g. an average fraction or proportion of the time that the channel is available at the secondary base station regardless of whether it is actually used by the secondary base station). The master base station may then perform associated flow control by basing a decision on routing data via the secondary base station on the probability that the channel is available (e.g. by routing via the secondary base station only if the probability is above a predetermined threshold).

In the above examples, the MeNB is described to comprise a macro base station. However, it will be appreciated that the MeNB may comprises any type of base station, e.g. a pico base station, a femto base station, a home base station. Further, it will be appreciated that either of the carriers F1 and/or F2 may be provided via a relay, a remote radio head, and/or the like instead of a base station.

In the above examples, each base station is described as comprising an eNB. However, it will be appreciated that the master base station can be a macro or pico LTE base station and the secondary base station can be a WLAN AP. The LTE base station and WLAN AP may be involved in carrier aggregation whereby the LTE base station provides packets to the WLAN AP. The UE can use both the LTE base station and the WLAN RF for communication.

In the above examples, each base station is described to provide a single carrier (F1 or F2). However, it will be appreciated that each base station may provide a plurality of carriers (e.g. the same and/or different set of carriers).

In the above examples, the information is received directly from the other base station. However, the information can be received from the other base station indirectly for example via the core network 3, and/or from the UE 3, either directly or indirectly for example via the other base station.

In the above description, there is only instance of split bearer shown. However, it will be appreciated that any number of split bearers may be provided for a particular UE. For example, multiple split bearers may be provided.

In the above description, the dual connectivity architecture described in TR 36.842 as Alternative 3C is referred to. However, this is for convenience only to aid understanding of the systems and methods described herein. It will be appreciated that the systems and methods described herein can be implemented as other architectures including, for example, inter eNB or inter RAT carrier aggregation architectures.

In the above description, the SeNB is described to generate and send a DL DATA DELIVERY STATUS frame for reporting the information. However, it will be appreciated that a different message and/or a different application protocol may also be used.

The base station may be configured to operate as a master base station of said dual connectivity configuration and the other base station may be configured to operate as a secondary base station of the dual connectivity configuration.

In the above exemplary embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop/tablet computers, web browsers, etc.

In the exemplary embodiments described above, the mobile telephone and the base stations will each include transceiver circuit. Typically this circuit will be formed by dedicated hardware circuits. However, in some exemplary embodiments, part of the transceiver circuit may be implemented as software run by the corresponding controller.

In the above exemplary embodiments, a number of software modules were described. As those skilled in the art will appreciate, the software modules may be provided in compiled or un-compiled form and may be supplied to the base stations as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from UK patent application No. 1501617.3, filed on Jan. 30, 2015, the disclosure of which is incorporated herein in its entirety by reference.

The invention claimed is:

1. A secondary base station for providing dual connectivity, with a master base station, to a user equipment (UE), the secondary base station comprising:
   at least one memory storing instructions; and
   at least one processor configured to process the instructions to:
      transmit, in a downlink (DL) DATA DELIVERY STATUS frame to the master base station, first information indicating a desired buffer size and second information indicating whether a radio link is unavailable, wherein:
      the desired buffer size is zero to cause the master base station receiving the DL DATA DELIVERY STATUS frame to stop transmitting data to the UE, and
      the second information is used by the master base station to determine a cause of the stopping.

2. A method performed by a secondary base station for providing dual connectivity, with a master base station, to a user equipment (UE), the method comprising:
   transmitting, in a downlink (DL) DATA DELIVERY STATUS frame to the master base station, first information indicating a desired buffer size and second information indicating whether a radio link is unavailable, wherein;
   the desired buffer size is zero to cause the master base station receiving the DL DATA DELIVERY STATUS frame to stop transmitting data to the UE, and
   the second information is used by the master base station to determine a cause of the stopping.

3. A method performed by a master base station for providing dual connectivity, with a secondary base station, to a user equipment (UE), the method comprising:
   receiving, in a downlink (DL) DATA DELIVERY STATUS frame from the secondary base station, first information indicating a desired buffer size and second information indicating whether a radio link is unavailable, wherein the desired buffer size is zero;
   stopping transmitting data to the UE based on the desired buffer size being zero; and
   determining a cause of the stopping based on the second information.

4. A master base station for providing dual connectivity, with a secondary base station, to a user equipment (UE), the master base station comprising:
   at least one memory storing instructions; and
   at least one processor configured to process the instructions to:
     receive, in a downlink (DL) DATA DELIVERY STATUS frame, from the secondary base station, first information indicating a desired buffer size and second information indicating whether a radio link is unavailable, wherein the desired buffer size is zero;
     stop transmitting data to the UE base on the desired buffer size being zero; and
     determine a cause of the stopping based on the second information.

\* \* \* \* \*